(12) United States Patent
Sugiyama et al.

(10) Patent No.: US 7,162,043 B2
(45) Date of Patent: Jan. 9, 2007

(54) MICROPHONE ARRAY SOUND SOURCE LOCATION SYSTEM WITH IMAGING OVERLAY

(75) Inventors: Takeshi Sugiyama, Aichi (JP); Hiroyuki Wada, Aichi (JP); Takefumi Zaima, Tokyo (JP); Masanao Owaki, Tokyo (JP); Yasuhiro Yamashita, 1-230, Tomida, Nagano-shi, Nagano 380-0882 (JP)

(73) Assignees: Chubu Electric Power Co., Inc., Aichi (JP); Kabushiki Kaisha Kumagaigumi, Tokyo (JP); Yasuhiro Yamashita, Nagoya (JP)

( * ) Notice: Subject to any disclaimer, the term of this patent is extended or adjusted under 35 U.S.C. 154(b) by 746 days.

(21) Appl. No.: 10/148,686

(22) PCT Filed: Oct. 1, 2001

(86) PCT No.: PCT/JP01/08633

§ 371 (c)(1),
(2), (4) Date: May 31, 2002

(87) PCT Pub. No.: WO02/29432

PCT Pub. Date: Apr. 11, 2002

(65) Prior Publication Data
US 2002/0181721 A1 Dec. 5, 2002

(30) Foreign Application Priority Data
Oct. 2, 2000 (JP) ............................. 2000-301709
Sep. 27, 2001 (JP) ............................. 2001-296350

(51) Int. Cl.
*H04R 3/00* (2006.01)
*H04R 1/02* (2006.01)
*G01S 3/80* (2006.01)

(52) U.S. Cl. ..................... 381/92; 381/91; 381/122; 367/125; 367/127

(58) Field of Classification Search ............. 381/92, 381/91, 122; 348/14.05, 271.99; 367/125, 367/127
See application file for complete search history.

(56) References Cited

U.S. PATENT DOCUMENTS

| | | | | |
|---|---|---|---|---|
| 4,559,642 A | * | 12/1985 | Miyaji et al. | ............ 381/92 |
| 4,768,086 A | * | 8/1988 | Paist | ............ 381/56 |
| 5,737,431 A | | 4/1998 | Brandstein et al. | |
| 5,930,202 A | * | 7/1999 | Duckworth et al. | ........ 367/127 |
| 6,469,732 B1 | * | 10/2002 | Chang et al. | ........ 348/14.08 |

(Continued)

FOREIGN PATENT DOCUMENTS

GB 490322 8/1938

(Continued)

*Primary Examiner*—Vivian Chin
*Assistant Examiner*—Douglas Suthers
(74) *Attorney, Agent, or Firm*—Takeuchi&Kubotera, LLP (57) ABSTRACT

In order to locate and display the source of a sound such as a noise at a factory or the like accurately even when it is outside, a pair of microphones (M1, M3) and another pair of microphones (M2, M4) are disposed on the X axis and Y axis with a distance L therebetween, respectively, the direction of the sound source is estimated from a difference between sound arrival times to the microphones (M1, M3) and a difference between sound arrival times to the microphones (M2, M4), an image around the estimated location of the sound source is picked up by a camera, and the above estimated location of the sound source is displayed on the above image displayed on the display of a personal computer.

13 Claims, 6 Drawing Sheets

U.S. PATENT DOCUMENTS 6,788,337 B1 * 9/2004 Fujii ..................... 348/207.99

FOREIGN PATENT DOCUMENTS

| GB | 2097121 | | 10/1982 |
| GB | 2097121 A | | 10/1982 |
| GB | 2097121 A | * | 10/1982 |
| JP | 01109996 | | 4/1989 |
| JP | 01164089 | | 6/1989 |
| JP | 05145928 | * | 6/1993 |
| JP | 07218614 | | 8/1995 |
| JP | 10332807 | | 12/1998 |
| WO | WO 87/02144 | | 5/1987 |
| WO | WO 00/02388 | | 1/2000 |
| WO | WO-0002388 | | 1/2000 |

* cited by examiner

MICROPHONE ARRAY SOUND SOURCE LOCATION SYSTEM WITH IMAGING OVERLAY

BACKGROUND OF THE INVENTION

1. Field of the Invention

The present invention relates to a sound source locating system for locating the source of a noise and displaying the location of the source to cope with noises at a factory or the like.

2. Description of the Prior Art

At a factory or the like, many kinds of low-frequency noises having a frequency of 50 Hz to 60 Hz or a frequency double that frequency are generated from a power supply box and a transformer such as a relay. To cope with such noises, an operator measures a sound pressure distribution around a noise generating device with a noise meter to locate the source of the noise and take countermeasures against it. However, it is time-consuming and not efficient to locate the source. Then, a method of estimating the source of a sound such as a noise using an acoustic technique is now under study.

Conventionally proposed sound source locating methods include (1) one making use of the correlation between sound pressure waveforms and (2) one making use of acoustic holography. In the method (1), the property of a correlation function is utilized to estimate the location of a sound source from the correlation between sound waveforms collected at a plurality of locations whereas in the method (2), a basic wave is scanned in a space to be investigated, an interference sound generated by interference between the above basic wave and a noise is recorded for each scanning direction, and a sound pressure distribution in the space in which the basic wave has been scanned is reproduced from the obtained record to estimate the source of the noise.

Although measurement and analysis take long in the above method making use of the correlation between sound pressure waveforms and the above method making use of acoustic holography, the methods are effective in a limited space but have a problem that a system becomes large in size to improve accuracy when a sound source is located outside.

It is conceivable that a sound source is located using a directional microphone. Since most noises at a factory or the like are sounds having a low frequency range as described above, they have low directionability and even when a microphone is provided with directionability, it is difficult to locate a sound source.

In view of the above problems of the prior art, it is an object of the present invention to provide a sound source locating system which is simple in structure and can locate and display the source of a sound such as a noise at a factory or the like with high accuracy even when it is outside.

SUMMARY OF THE INVENTION

According to a first aspect of the present invention, there is provided a sound source locating system which comprises microphones including three microphones arranged two-dimensionally, means of estimating the location of a sound source from phase differences among the output signals of the microphones (such as information on the phase angle of the cross spectrum of the output signals), means of picking up an image around the estimated location of the sound source and means of displaying the above estimated location of the sound source on the picked up image in order to estimate the location of the sound source and display the estimated location of the sound source on the image around the location of the sound source displayed on the display means such as a display.

According to a second aspect of the present invention, there is provided a sound source locating system, wherein a pair of microphones spaced apart from each other by a predetermined distance are each disposed on two crossing straight lines, for example, a pair of microphones are placed at $X1=(L_1/2, 0)$ and $X2=(-L_1/2, 0)$ on the X axis and the other pair of microphones are placed at $Y1=(0, L_2/2)$ and $Y2=(0, -L_2/2)$ on the Y axis, a difference between sound arrival times to each pair of microphones is obtained, and the direction of the sound source is estimated from the above arrival time differences.

According to a third aspect of the present invention, there is provided a sound source locating system which comprises microphones including four microphones arranged three-dimensionally, means of estimating the location of a sound source from phase differences among the output signals of the microphones, means of picking up an image around the estimated location of the sound source and means of displaying the estimated location of the sound source on the picked up image.

According to a fourth aspect of the present invention, there is provided a sound source locating system, wherein a pair of microphones spaced apart from each other by a predetermined distance are each disposed on three crossing straight lines, a difference between sound arrival times to each pair of microphones is obtained, and the location of the sound source is estimated from the above arrival time differences.

According to a fifth aspect of the present invention, there is provided a sound source locating system which comprises microphones consisting of two pairs of microphones disposed on two crossing straight lines with a predetermined distance therebetween and a fifth microphone not existent on the same plane as the above two pairs of microphones, means of estimating the location of a sound source from phase differences among the output signals of the microphones, means of picking up an image around the estimated location of the sound source and means of displaying the estimated location of the sound source on the picked up image in order to estimate the location of the sound source from differences among sound arrival times to the microphones obtained from the above phase differences and display the estimated location of the sound source on the image around the location of the sound source displayed on the display means such as a display.

According to a sixth aspect of the present invention, there is provided a sound source locating system, wherein the above two pairs of microphones are disposed on two crossing straight lines, respectively, to form a regular square, the fifth microphone is disposed on a straight line passing through the center of the regular square and perpendicular to the above two straight lines to make the distances between the fifth microphone and the microphones forming the square equal to one another, and differences among sound arrival times to the microphones are obtained to estimate the location of the sound source.

According to a seventh aspect of the present invention, there is provided a sound source locating system, wherein the fifth microphone is arranged such that the distances between the fifth microphone and the other microphones forming the regular square are made equal to the distance between each pair of the microphones.

According to an eighth aspect of the present invention, there is provided a sound source locating system, wherein the color of a symbol for the location of the sound source displayed is changed according to the level of sound pressure or the height of frequency. This makes it possible to display not only the locations of a plurality of sound sources when existent but also the sound pressure levels and frequency characteristics of the sound sources. Therefore, it is possible to judge the characteristic features of the sound sources visually.

According to a ninth aspect of the present invention, there is provided a sound source locating system, wherein the microphones are moved to a plurality of positions, thereby improving the estimation accuracy of the location of the sound source.

According to a tenth aspect of the present invention, there is provided a sound source locating system, wherein the microphones are rotated to collect sounds at a plurality of angles, thereby improving the estimation accuracy of the location of the sound source.

According to an eleventh aspect of the present invention, there is provided a sound source locating system, wherein the microphones are used to collect a sound at predetermined time intervals to obtain the location of the sound source at each measurement time in order to estimate the movement of the location of the sound source.

According to a twelfth aspect of the present invention, there is provided a sound source locating system which comprises means of measuring the absolute locations on the ground of the microphones to specify the absolute location on the ground of the sound source from the measurement locations of the microphones.

According to a thirteenth aspect of the present invention, there is provided a sound source locating system which comprises means of storing data on the sound pressure of a sound source which is collected by the microphones and normal and means of comparing newly collected sound pressure data with the above stored sound pressure data.

Other objects and advantages of the present invention will become apparent from the following description when taken in conjunction with the accompanying drawings.

DETAILED DESCRIPTION OF THE PREFERRED EMBODIMENTS

Preferred embodiments of the present invention will be described hereinbelow with reference to the accompanying drawings.

Embodiment 1

Figure 1:
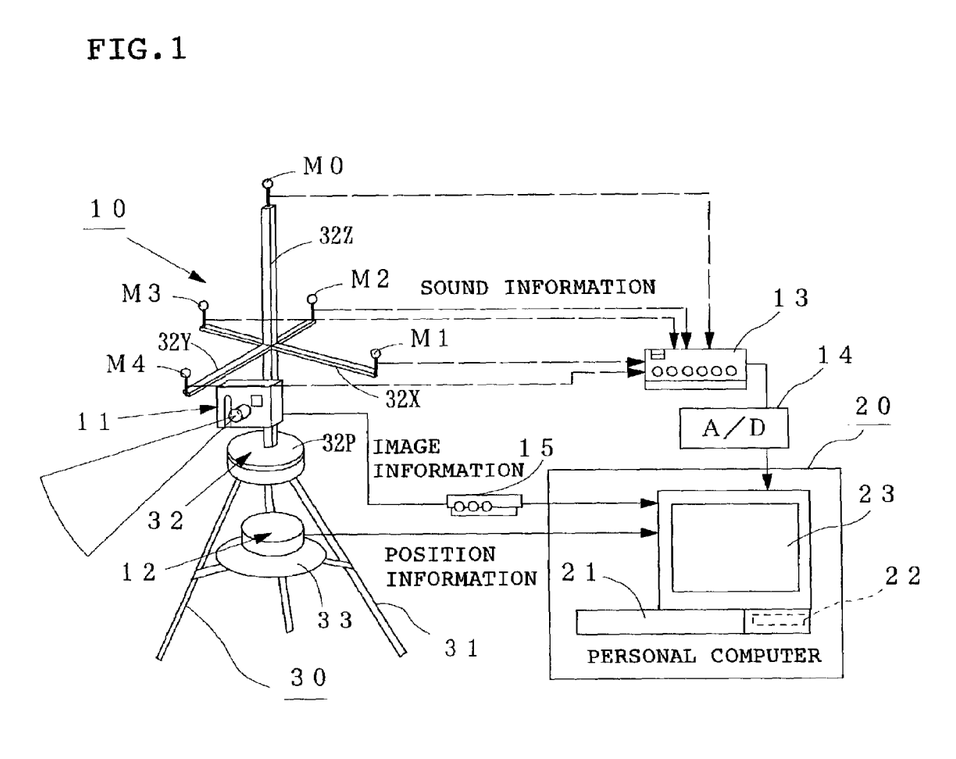
FIG. 1 is a schematic diagram of a sound source locating system according to Embodiment 1 of the present invention.

FIG. 1 is a schematic diagram of a sound source locating system according to Embodiment 1. M1 to M4 are microphones for measuring the sound pressure level of a noise from an unshown sound source, M0 is an auxiliary measuring microphone, 11a CCD camera for picking up an image around the location of the sound source (to be simply referred to as "camera" hereinafter), 12 GPS for specifying the ground positions of the above microphones M0 to M4, 13 amplifier for amplifying sound pressure signals collected by the above microphones M0 to M4, 14 A/D converter for converting the amplified sound pressure signals (analog signals) into digital signals, and 15a video input/output unit for converting the image signal (analog signal) of the camera 11 into a digital signal.

Figure 2:
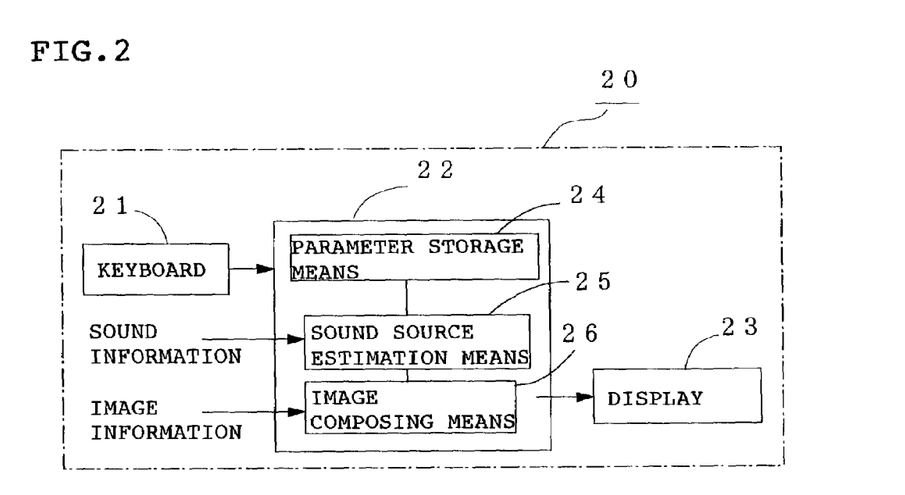
FIG. 2 is a functional block diagram of the storing/computing unit of a personal computer according to Embodiment 1 of the present invention.

As shown in FIG. 2, denoted by 20 is a personal computer which comprises a keyboard 21 as input means, a storing/computing unit 22 for computing the estimation of the location of the sound source and a display 23 as image display means. The above storing/computing unit 22 comprises parameter storage means 24 for storing measurement parameters, sound source location estimating means 25 for estimating the location of the sound source by a hyperbolic technique using the A/D converted sound pressure signals of the microphones M1 to M4 and image composing means 26 for composing an image by adding an image showing the estimated location of the sound source to an image from the above camera 11 and sending it to the above display 23.

30 denotes a base which comprises a support member 31 composed of a tripod and a rotary frame 32, disposed on the top of the support member 31, for mounting the microphones M0 to M4, the microphone M0 is mounted to the top of a vertical frame 32Z projecting upward from the rotary plate 32P of the above rotary frame 32, and the microphones M1 to M4 are mounted to both ends of two horizontal frames 32X and 32Y crossing each other and projecting from the above vertical frame 32Z. The camera 11 is mounted to a lower portion of the above vertical frame 32Z and rotated together with the above microphones M0 to M4. GPS 12 is mounted on a mounting plate 33 attached below the above rotary frame 32.

The base 30 mounting the above microphones M0 to M4, the camera 11 and GPS12 is called "measurement unit 10" hereinafter.

The hyperbolic technique is used to estimate the location of the above sound source, making use of the fact that the location (x, y, z) of the sound source is on the surface of a spindle whose axis is a straight line passing through a pair of microphones (Mi, Mj) and which is determined by a constant calculated from a difference between sound arrival times to the pair of microphones at a predetermined distance from the sound source (time delay Dij), a distance between the microphones and sound velocity. A pair of microphones spaced apart from each other by a predetermined distance are each disposed on three crossing straight lines to obtain a difference between sound arrival times to each pair of microphones, and at least three spindles are obtained from the above arrival time differences to obtain the location (x, y, z) of the sound source from the intersecting point of these spindles.

Figure 3A:
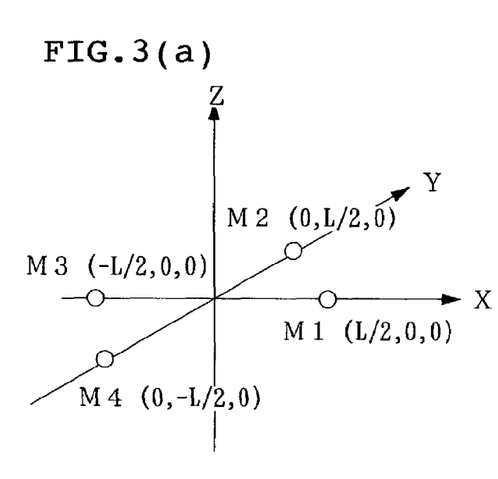
FIG. 3 is a diagram showing the arrangement of microphones according to Embodiment 1 of the present invention.
Figure 3B:
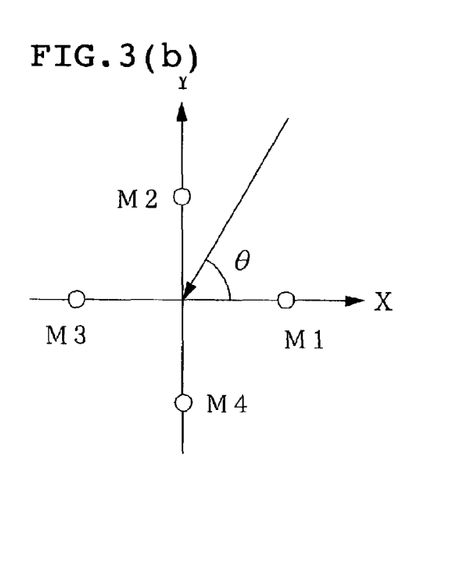

In this Embodiment 1, the direction of the sound source is estimated based on the assumption that the sound source is situated on the X-Y plane. Therefore, as shown in FIGS. 3(a) and 3(b), a pair of microphones (M1, M3) and another pair of microphones (M2, M4) are placed at points (L/2, 0, 0) and (−L/2, 0,0) on the X axis and at points (0, L/2, 0) and (0, −L/2, 0) on the Y axis with a distance L therebetween, respectively, and the frequencies of output signals from the pairs of microphones (M1, M3) and (M2, M4) are analyzed to estimate the location of the sound source from a time delay Dij (differences Dx and Dy between sound arrival times to the pair of microphones (M1, M3) and between sound arrival times to the pair of microphones (M2, M4) in this embodiment) between the microphone Mi and the microphone Mj at a frequency f.

When the distance from the above sound source to the system is much larger (for example, 10 times or more) than the distance L between the microphones, it is possible that the sound is regarded as a plane wave and the direction θ of the sound source is represented by the following approximation (1).

$$\theta = \tan^{-1}(Dy/Dx) \quad (1)$$

The above time delay Dij is calculated from the following equation (2) by obtaining the cross spectrum Pij (f) of a signal input into the two microphones Mi and Mj and using the phase angle information ψ(rad) of the above frequency f.

$$Dij = 1/(2\pi f)\psi[Pij(f)](\text{sec}) \quad (2)$$

The direction θ of the sound source can be calculated for each frequency.

The distance L between the pair of microphones (M1, M3) and between the pair of microphones (M2, M4) is determined according to the main frequency range of the noise to be measured. In this Embodiment 1, the above noise to be analyzed is a sound having a peak at 120 Hz, 240 Hz and 360 Hz generated from a transformer at a factory or the like (a peak at 60 Hz which is a fundamental wave is excluded because its background is large) and the above L is set to 0.42 m so that a noise having a frequency band of about 490 Hz or less can be measured with high sensitivity.

The auxiliary measuring microphone M0 having a height different from those of the microphones M1 to M4 is used to measure an impulse signal as a TPS signal (time delaying pulse signal) in order to confirm the influence of a reflection wave.

Figure 4:
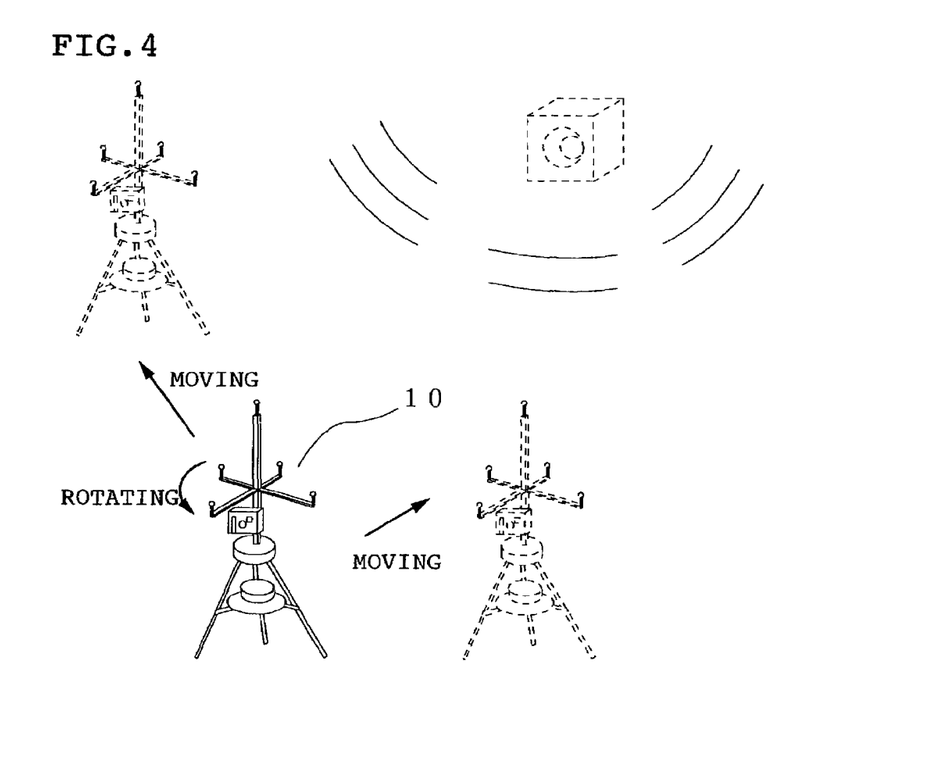
FIG. 4 is a diagram for explaining the movement of a measurement unit.

Although the above direction θ of the sound source can be obtained by one time of measurement, in this Embodiment 1, as shown in FIG. 4, the measurement accuracy of the direction θ of the sound source is improved by moving the measurement unit 10 to a plurality of positions, or by rotating the rotary frame 32 at the same measurement position to carry out measurement at a plurality of angles.

Figure 5:
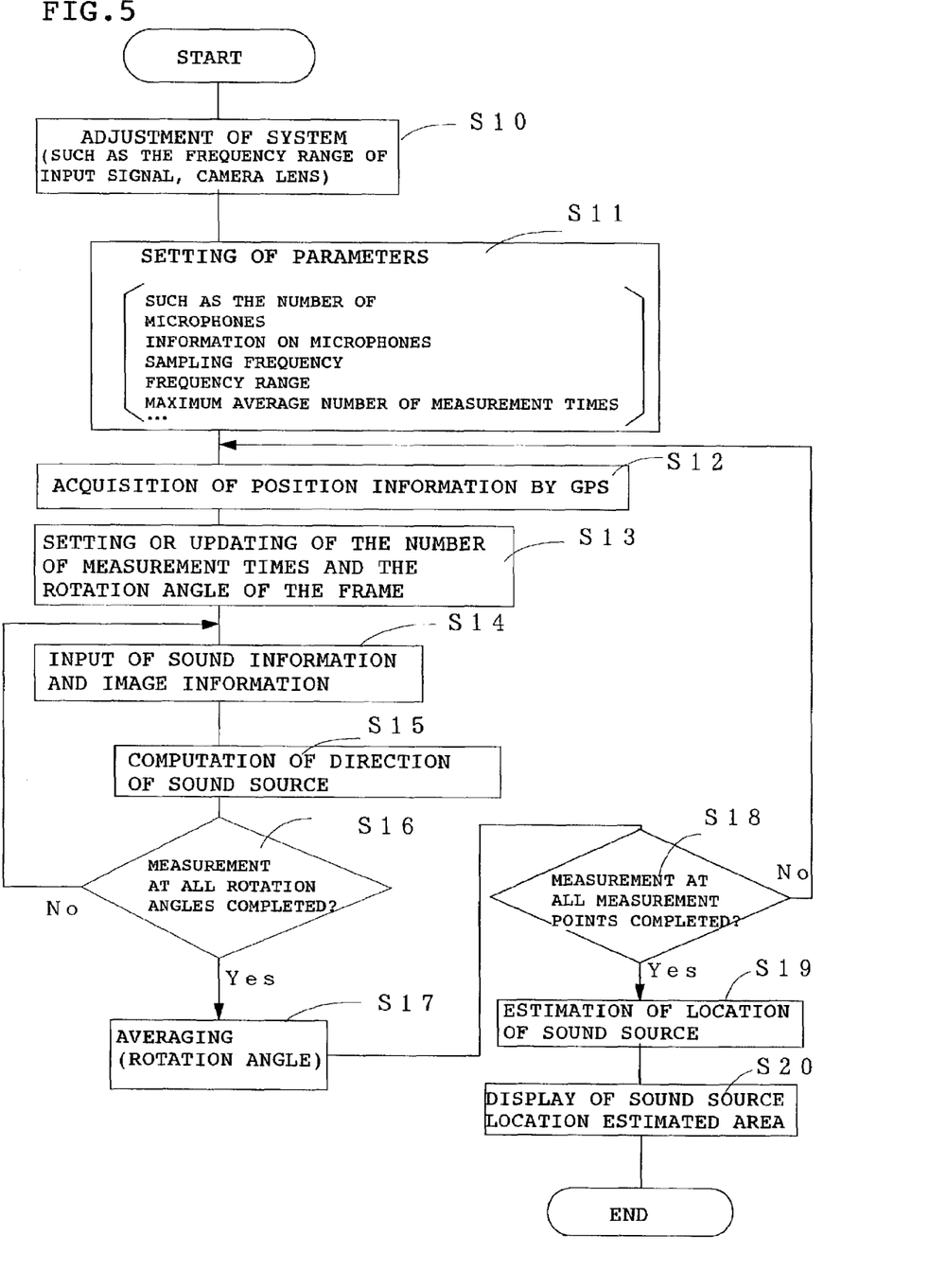
FIG. 5 is a flow chart of a sound source locating method according to Embodiment 1 of the presents invention.

A description is subsequently given of the method of estimating the direction of a sound source using the above sound source locating system with reference to the flow chart of FIG. 5.

After the measurement unit 10 is first installed at a position where a noise from its source can be collected, the adjustment of the system such as the frequency range of an input signal and the lens of the camera is carried out (step S10). At this point, the horizontal frame 32X (or horizontal frame 32Y) is adjusted to a predetermined start position (provisional, X axis or Y axis).

Thereafter, parameters such as the number of microphones and the sampling frequency are stored in the parameter storage means 24 in the storing/computing unit 22 of the personal computer 20 from the keyboard 21 (step S11). The above parameters also include information on the arrangement of the microphones, the frequency range passing through an unshown filter and the maximum average number of measurement times besides the number of measurement positions, the number of microphones and the sampling frequency. Since the parameter storage means 24 stores these initial set values, only changed parameters are input into this parameter storage means 24.

Subsequently, the center positions of the microphones M0 to M4, that is, the absolute positions on the ground of the microphones are measured by GPS 12 mounted to the measurement unit 10 and input into the personal computer 20 (step S12), and then the number of measurement times and the rotation angle of the frame at the above measurement position are input from the keyboard 21 (step S13). The level of sound pressure (sound information) and image information may be collected by rotating the rotary frame 32 each time measurement is made or by rotating the rotary frame 32 after measurement is made a plurality of times at the same angle.

In this Embodiment 1, sound information and image information are collected once at a frame rotation angle of 0 ° (initial position), 90°, 180° or 270° by means of the microphones M1 to M4 and the camera 11, and the collected sound information and image information are input into the personal computer 20 (step S14). That is, in this embodiment, the measurement conditions are set such that measurement is carried out four times at that position. Sound pressure signals which are the outputs of the microphones M1 to M4 and the microphone M0 are amplified by the amplifier 13 and converted into digital signals by the A/D converter 14. An image signal from the camera 11 is converted into a digital signal by the video input/output unit 15 and then input into the personal computer 20.

The personal computer 20 carries out computation for the estimation of the location of the sound source using sound information from the above microphones M1 to M4, the above-described hyperbolic technique or the approximation (1) for the direction θ of the sound source (step S15).

Subsequently, it is judged whether measurement at all the frame rotation angles is completed (step S16) and when it is not, the rotary frame 32 is rotated at 90° and the routine returns to step S14 to collect sound information and image information at the next frame rotation angle. When measurement at all the frame rotation angles is completed, the rotary frame 32 is returned to the initial position and the processing of averaging the locations of the sound source obtained at all the measurement positions is carried out (step S17).

Thereafter, it is judged whether measurement at all the measurement points is completed (step S18) and when it is not, the measurement unit 10 is moved to the next measurement position to carry out the operations of the above steps S12 to S17.

Figure 6:
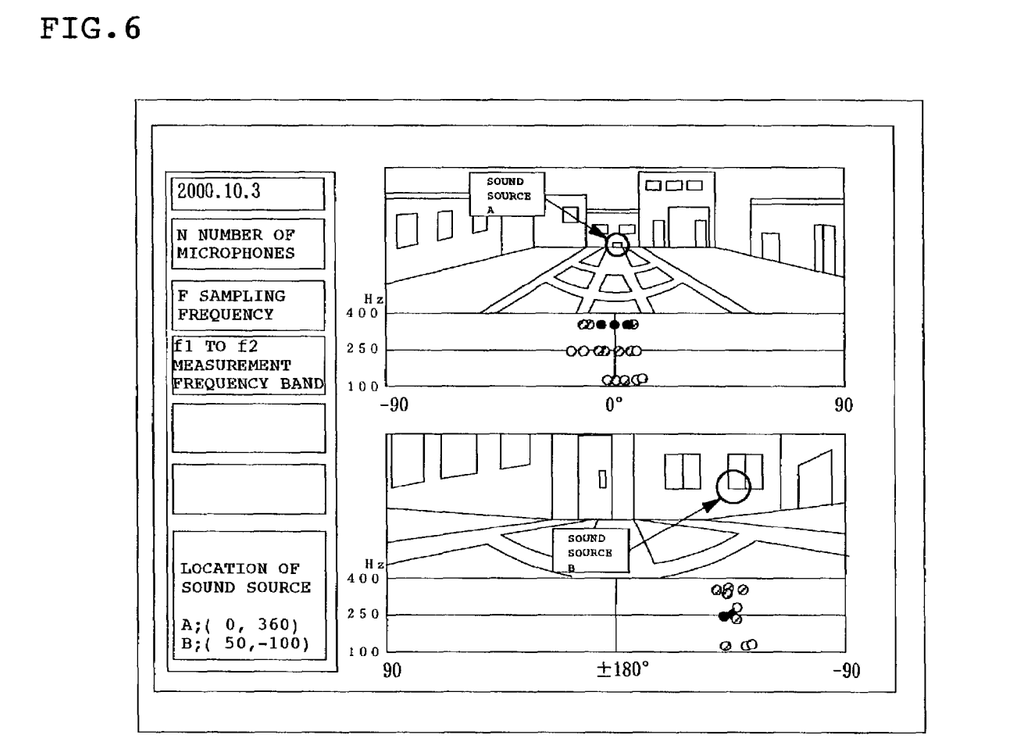
FIG. 6 is a diagram showing an example of a display image according to Embodiment 1 of the present invention.

When measurement at all the measurement points is completed, the most reliable location of the sound source is estimated from data on the location of the sound source at each measurement point (step S19) and then an image which shows the estimated location of the sound source the best is selected to display the sound source location estimation area on the image as shown in FIG. 6 (step S20).

Even when there are a plurality of sound sources, the sound source locating system of the present invention can specify the locations of the plurality of sound sources and calculate the contribution rates of the sound sources to each frequency. For example, it can compute and display the locations of the plurality of sound sources such as the estimated area A of the location of a sound source which is located at "0°" in the forward direction and the estimated area B of the location of a sound source which is located at "–45°" in the rear direction and detailed information on the sound sources such as the intensity of each sound having a different frequency at an angle from the measurement position. It is possible to change the color of a symbol for the location of a sound source displayed according to the level of sound pressure or the height of frequency. For example, to change the color of a symbol for the location of a sound source displayed according to the level of sound pressure, the symbol (circle) colored according to the level of sound pressure is displayed on the image that shows the location of the sound source the best, a frequency distribution graph which plots the direction of the sound source on the X axis and frequency on the Y axis b is displayed below the image, and symbols in the graph are colored different corresponding to each level of sound pressure so that even when there are a plurality of sound sources which differ from one another in sound pressure level or frequency, the locations of the sound sources can be known visually, thereby making it possible to know the characteristic features of the sound sources in detail easily.

A symbol colored according to the height of frequency may be displayed on the image that shows the location of the sound source the best and a sound pressure distribution graph which plots the direction of the sound source on the X axis and the level of sound pressure on the Y axis may be displayed below this image. Symbols in the above graph may be colored different according to the height of frequency The coordinates of the estimated location of the sound source may be displayed at the same time. The above coordinates may be values from the preset origin (0,0) or the absolute position on the ground of the estimated location of the sound source calculated based on the location of the measurement unit 10 measured by the above GPS 12.

Thus, according to this Embodiment 1, the direction of the sound source is estimated from a difference between the output signal arrival times of the pair of microphones (M1, M3) disposed on the X axis with a distance L therebetween and a difference between the output signal arrival times of the pair of microphones (M2, M4) disposed on the Y axis with the distance L therebetween, and an image around the estimated location of the sound source is picked up by the camera 11 so that the estimated location of the sound source is displayed on the picked up image displayed on the display 23 of the personal computer 20. Therefore, the source of a sound such as a noise at a factory or the like can be specified and displayed accurately with a simple structure even when it is outside. By changing the color of a symbol for the location of a sound source displayed as an image according to the level of sound pressure or the height of frequency, even when there are a plurality of sound sources, the locations of the sound sources can be specified and the characteristic features of the sound sources can be known visually.

The measurement accuracy of the direction θ of the sound source can be improved by moving the measurement unit 10 comprising the microphones M0 to M4, the camera 11 and GPS 12 mounted on the base 30 to a plurality of positions, or by rotating the rotary frame 32 to measure at a plurality of angles and at the same measurement position.

In the above Embodiment 1, four microphones are used to estimate the direction of the sound source. However, three microphones which are not disposed on a straight line (on a plane) may be used to estimate the direction of the sound source.

In the above embodiment, two pairs of microphones (M1, M3) and (M2, M4) are used to estimate the direction of the sound source. Further, three pairs of microphones including another pair of microphones disposed in the Z-axis direction may be used to obtain the horizontal angle θ and elevation angle φ of the location of the sound source. Theoretically, the location of a sound source can be estimated by using four microphones arranged three-dimensionally on three crossing straight lines. However, to facilitate signal processing and computation, three pairs of microphones which are spaced apart from each other by a predetermined distance are preferably disposed on three straight lines, namely, X axis, Y axis and Z axis to estimate the location of the sound source.

In the above embodiment, the rotary frame 32 is rotated at each measurement position for measurement. Even when the measurement unit 10 is moved to a plurality of positions without rotating the rotary frame 32 or when the rotary frame 32 is rotated at the same measurement position without moving the measurement unit 10 to a plurality of positions, the direction θ of the sound source can be measured accurately. When the rotary frame 32 is not rotated, the optimum image around the sound source must be picked up by turning the camera 11 toward the estimated direction of the sound source.

It is needless to say that the distance L between the microphones is not limited to 0.42 m and may be suitably determined according to the properties of the sound source.

The movement of the sound source can be estimated by collecting a sound at predetermined time intervals at one measurement position or measurement angle to obtain the location of the sound source at each measurement time.

Embodiment 2

Figure 7:
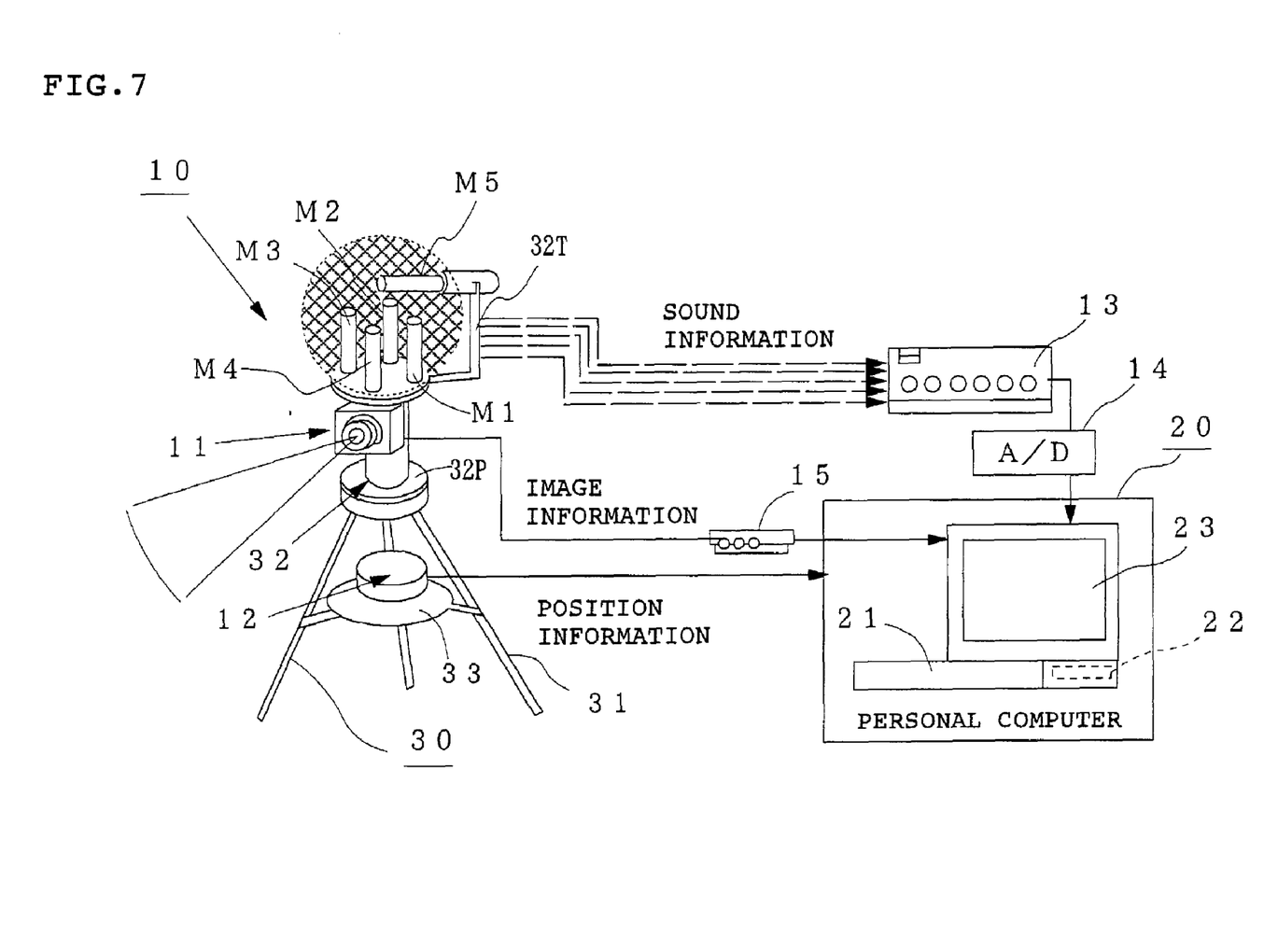
FIG. 7 is a schematic diagram of a sound source locating system according to Embodiment 2 of the present invention.

FIG. 7 is a schematic diagram of a sound source locating system according to Embodiment 2. In this Embodiment, five microphones M1 to M5 arranged in a square columnar form are used to estimate the horizontal angle θ and elevation angle φ of the sound source. Although other elements are the same as in the above Embodiment 1, in this Embodiment 2, sound information from the above microphones M1 to M5 is used to estimate the location of the sound source by means of the personal computer 20.

A description is subsequently given of an example of the arrangement of the microphones M1 to M5.

Figure 8:
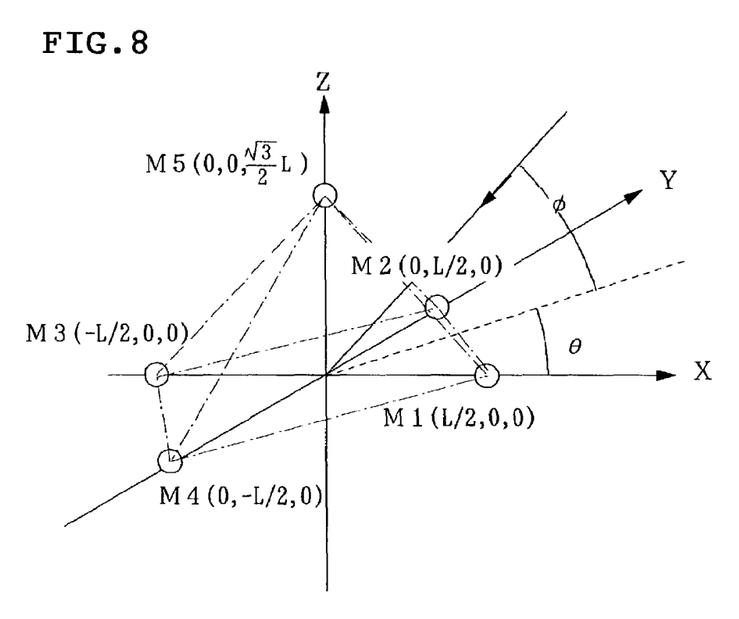
FIG. 8 is a diagram showing the arrangement of microphones according to Embodiment 2 of the present invention.

As shown in FIG. 7 and FIG. 8, the microphones M1 to M4 are disposed above the above rotary frame 32 (in the Z-axis direction) so that their detection portions form a regular square with the origin O on the X-Y plane as the center thereof. Specifically, the detection portions of the microphones M1 and M3 are placed at points (L/2, 0, 0) and (–L/2, 0, 0) on the X axis and the detection portions of the microphones M2 and M4 are placed at points (0, L/2, 0) and (0, –L/2, 0) on the Y axis perpendicular to the X axis.

As shown in FIG. 7 and FIG. 8, the fifth microphone M5 is held to the end of a substantially L-shaped member 32T projecting from the side of the above rotary frame 32 and extending upward and its detection portion is located above the center of the regular square constituted by the above four microphones M1 to M4. The coordinates of the detection portion of the microphone M5 are shown below.

$$\left(0, 0, \frac{\sqrt{3}}{2}L\right)$$

Thereby, the microphones M1 to M5 are disposed such that the distances between the fifth microphone and the microphones M1 to M4 should be equal to the distance L between the microphones (M1, M3) and the distance L between the microphones (M2, M4). In this embodiment, the above L is set to 0.35 m so that a noise from a transformer at a factory or the like can be measured with high sensitivity.

A description is subsequently given of the method of estimating the location of a sound source.

In the actual measurement, as the location of the sound source is very far from the locations of the microphones, a sound that reaches the microphones can be regarded as a plane wave. Then, in this embodiment, to obtain the location of the sound source, the location of the sound source is estimated based on the assumption that the location of the sound source is very far (for example, 10 times or more the distance L) from the locations of the microphones and the sound is input into the microphones as a plane wave.

In the approximation of the plane wave, since a time delay Dij between the microphone Mi and the microphone Mj and the horizontal angle θ and elevation angle φ of the location of the sound source are represented by the following equations (3) and (4), the frequencies of the output signals of the microphones M1 to M5 are analyzed to calculate differences (time delay) Dij in sound arrival time among the microphones M1 to M5 at a frequency f to obtain the above horizontal angle θ and elevation angle φ.

$$\theta = \tan^{-1}(D_{13}/D_{24}) \quad (3)$$

$$\Phi = \tan^{-1}\left(\frac{D_{51} + D_{52} + D_{53} + D_{54}}{2\sqrt{3} \cdot \sqrt{D_{13}^2 + D_{24}^2}}\right) \quad (4)$$

The above time delay Dij is the same as in the above embodiment 1 and calculated using the above equation (2).

The location of the sound source can be calculated for each frequency.

Thereby, an image around the above estimated location of the sound source is picked up by the camera 11 so that the estimated location of the sound source can be displayed on the display 23 of the personal computer 20.

The method of estimating the location of a sound source is almost the same as in the above embodiment 1 except that the personal computer 20 uses sound information from the above microphones M1 to M5 to estimate the horizontal angle θ and elevation angle φ of the location of the sound source by the above-described method of estimating the location of a sound source.

Figure 9:
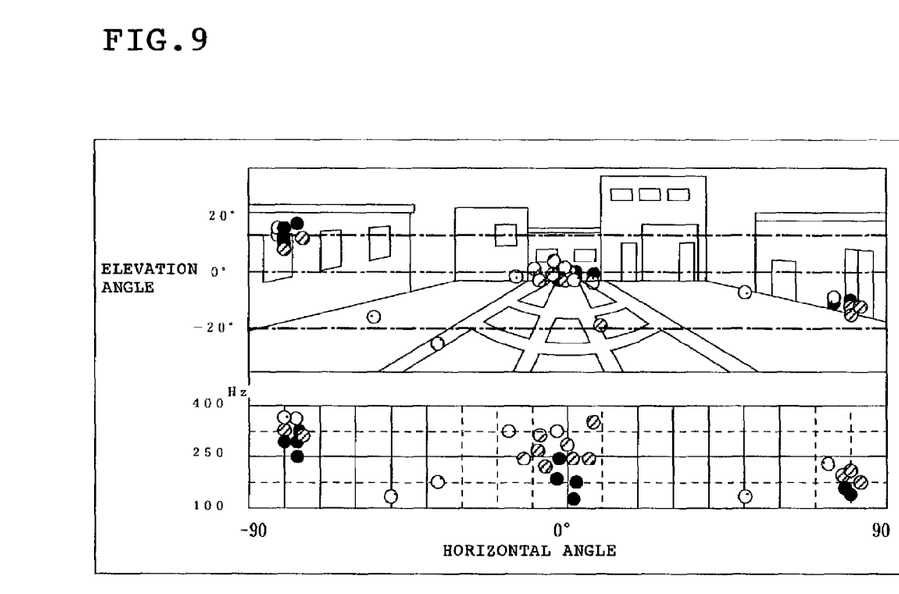
FIG. 9 is a diagram showing an example of a display image according to Embodiment 2 of the present invention.

FIG. 9 shows an example of an image showing the location of a sound source according to Embodiment 2. In this Embodiment, the horizontal angle θ is plotted on the X axis and the elevation angle φ is plotted on the Y axis of the image around the sound source displayed and a symbol for the location of the sound source on the above coordinates (θ, φ) can be displayed.

The color of the symbol for the location of the sound source displayed can be changed according to the level of sound pressure or the height of frequency. For example, when the symbol for the location of the sound source displayed is changed according to the level of sound pressure, symbols (circles) colored different according to the level of sound pressure are displayed on an image that shows the location of the sound source the best, a frequency distribution graph which plots the direction of the sound source on the X axis and frequency on the Y axis is displayed below the image, and symbols in the graph are colored different according to the level of sound pressure so that even when there are a plurality of sound sources which differ from one another in the level of sound pressure or frequency, the locations of these sound sources can be known visually, thereby making it possible to know the characteristic features of the sound sources in detail easily.

Also, symbols colored different according to the height of frequency may be displayed on the image that shows the location of a sound source the best and a sound pressure distribution graph which plots the direction of the sound source on the X axis and the level of sound pressure on the Y axis may be displayed below the image. Symbols in the graph may be colored different according to the height of frequency.

In the above Embodiment 2, the microphones M1 to M5 are disposed such that the distances between the fifth microphone M5 and the other microphones M1 to M4 should be equal to the distance L between the microphones (M1, M3) and the distance L between the microphones (M2, M4). The method of arranging the microphones is not limited to this. Basically, the above distances may not be equal to one another, two pairs of microphones are disposed on two crossing straight lines, and further the fifth microphone may be placed at a position not on the same plane as the above pairs of microphones. To facilitate computation for the estimation of the direction of the sound source, it is preferred that the microphones should be located at highly symmetrical positions. It is particularly preferred that the above two pairs of microphones should be disposed on two crossing straight lines so that they form a regular square, the fifth microphone should be disposed on a straight line passing through the center of the above regular square and perpendicular to the above straight lines, and the distances between the fifth microphone and the microphones forming the above regular square should become equal to one another.

In the sound source locating system of Embodiments 1 and 2, since the contribution rates of a plurality of sound sources to each frequency can be calculated as described above, when the system of the present invention comprises means of storing data on the sound pressure of a sound source which is normal and collected by the above microphones and means of comparing the above stored sound pressure data with newly collected sound pressure data, it can specify the location of a sound source which generates an abnormal sound, for example, the sound pressure level of a specific frequency of the newly collected sound pressure level data becomes higher than the past data or a new peak appears at a frequency band where no peak has ever been seen. Therefore, a sound source abnormality detection system is constructed by using this sound source locating system of the present invention and installed at a predetermined site within the premises of a factory to measure the location of a sound source regularly so that a sound source which generates an abnormal sound by a failure in a transformer or motor can be located, thereby making it possible to detect the abnormality of a noise generating device.

INDUSTRIAL FEASIBILITY

As described above, according to the present invention, the location of a sound source is estimated from phase differences among the output signals of microphones including three microphones arranged two-dimensionally or four microphones arranged three-dimensionally, and an image around the above estimated location of the sound source is picked up so that the estimated location of the sound source is displayed on the picked up image. Therefore, the sound source can be located and displayed with a simple structure.

A pair of microphones arranged with a predetermined space therebetween are each disposed on two or three crossing straight lines and a difference between sound arrival times to each pair of microphones is obtained to estimate the direction or location of the sound source using the hyperbolic technique or the approximation (plane wave approximation) of the direction of the sound source from the above arrival time differences in order to specify the direction or the location of the sound source accurately.

The location of the sound source is estimated from phase differences among the output signals of microphones consisting of two pairs of microphones disposed on two crossing straight lines with a predetermined space therebetween and a fifth microphone not existent on the same plane as the two pairs of microphones and an image around the estimated location of the sound source is picked up so that the estimated location of the sound source is displayed on the above image. Therefore, the sound source can be located and displayed with a simple structure.

The above two pairs of microphones are disposed on two crossing straight lines to form a regular square, the fifth microphone is located on a straight line passing through the center of the regular square and perpendicular to the above two straight lines, the distances between the fifth microphone and the microphones forming the regular square become equal to one another, and differences between sound arrival times to one of the pairs of microphones and between sound arrival times to the other pair of microphones are obtained to estimate the location of the sound source. Therefore, the direction or location of the sound source can be specified accurately.

When the fifth microphone is located such that the distances between the fifth microphone and the other microphones forming the above regular square become equal to the distance between the microphones of each pair, the distances between the pairs of the microphones for obtaining differences in arrival time can be made equal to each other, thereby making much easier computation for the estimation of the location of the sound source.

By changing the color of a symbol for the location of the sound source displayed on the image according to the level of sound pressure or the height of frequency, even when there are a plurality of sound sources, not only the locations of these sound sources but also the sound pressure levels and frequency characteristics of the sounds can be displayed. Therefore, the characteristic features of the sound sources can be judged visually.

Since the location of a sound source which generates an abnormal sound is specified by providing means of storing data on the sound pressure of a sound source which is normal and collected by the above microphones and means of comparing newly collected sound pressure data with the above stored sound pressure data, the abnormality of a noise generating device can be detected without fail.

Further, since the microphones are moved to a plurality of positions or the microphones are rotated to measure at a plurality of points or at a plurality of angles, the estimation accuracy of the location of the sound source can be improved.

Since a sound is collected at predetermined time intervals to obtain the location of the sound source at each measurement time, the movement of the location of the sound source can be estimated.

Since locating means such as GPS for measuring the absolute positions on the ground of the microphones is provided, the absolute position on the ground of the location of the sound source can be specified.

What is claimed is:

1. A sound source locating system for determining a location of a sound source, comprising:
    at least three microphones arranged two-dimensionally in two pairs, one of said two pairs being arranged on a first line, the other of said two pairs being arranged on a second line crossing the first line,
    means of estimating the location of the sound source from a ratio of phase differences or arrival time differences of arrival sound between the two pairs of the microphones,
    means of picking up an image around the location of the sound source, and
    means of displaying the location of the sound source on the image.

2. The sound source locating system of claim 1, further comprising a fourth microphone to form the two pairs of the microphones together with the at least three microphones, said two pairs of the microphones being arranged on the first line and the second line perpendicular to the first line to be spaced apart from each other by a predetermined distance, said means of estimating the location of the sound source measuring a difference between sound arrival times of each of the two pairs of the microphones so that the location of the sound source is estimated from the ratio of the arrival time differences.

3. A sound source locating system for determining a location of a sound source, comprising:
    at least four microphones arranged threedimensionally, at least three microphones of said at least four microphones being arranged on a common plane in two pairs, at least one microphone of said at least four microphones being arranged away from the common plane, one of said two pairs being arranged on a first line, the other of said two pairs being arranged on a second line crossing the first line,
    means of estimating the location of the sound source from a ratio of phase differences or arrival time differences of arrival sound between the two pairs of the microphones and phase differences or arrival time differences of arrival sound between the at least three microphones on the common plane and the at least one microphone away from the common plane,
    means of picking up an image around the estimated location of the sound source, and
    means of displaying the estimated location of the sound source on the picked up image.

4. The sound source locating system of claim 3, further comprising one pair of microphones arranged on a third line crossing the first line and the second line to be spaced apart from each other by a predetermined distance, said means of estimating the location of the sound source measuring a difference between sound arrival times of each of the two pairs and the one pair of the microphones so that the location of the sound source is estimated from the ratio of the arrival time differences.

5. The sound source locating system of claim 3 which comprises microphones consisting of the two pairs of the microphones disposed on the first and second lines with a predetermined distance therebetween and a fifth microphone not existent on the common plane as the two pairs of the microphones, the means of estimating the location of the sound source from the phase differences among output signals of the microphones, the means of picking up the image around the estimated location of the sound source, and the means of displaying the estimated location of the sound source on the picked up image.

6. The sound source locating system of claim 5, wherein the two pairs of the microphones are disposed on the first and second lines, respectively, to form a regular square, the fifth microphone is disposed on a straight line passing through the center of the regular square and perpendicular to the first and second lines, and the differences among the sound arrival times to the microphones are obtained to estimate the location of the sound source.

7. The sound source locating system of claim 6, wherein the fifth microphone is arranged such that the distances between the fifth microphone and the other microphones forming the regular square are made equal to the distance between each pair of the microphones.

8. The sound source locating system of any one of claims 1 to 7, wherein color of a symbol for the location of the sound source displayed is changed according to a level of sound pressure or a height of frequency.

9. The sound source locating system of claim 1 or 3, wherein the microphones are moved to a plurality of positions.

10. The sound source locating system of claim 1 or 3, wherein the microphones can be rotated.

11. The sound source locating system of claim 1 or 3, wherein the microphones are used to collect sound at predetermined time intervals to estimate movement of the location of the sound source.

12. The sound source locating system of claim 1 or 3 which comprises means of measuring absolute locations of the microphones on ground.

13. The sound source locating system of claim 1 or 3 which comprises means of storing data on a sound pressure of the sound source which is collected by the microphones in a normal state and means of comparing newly collected sound pressure data with the stored sound pressure data.

* * * * *